Feb. 19, 1952
C. O. GLASGOW
2,586,221
HORIZONTAL SEPARATOR
Filed Jan. 12, 1950
2 SHEETS—SHEET 1
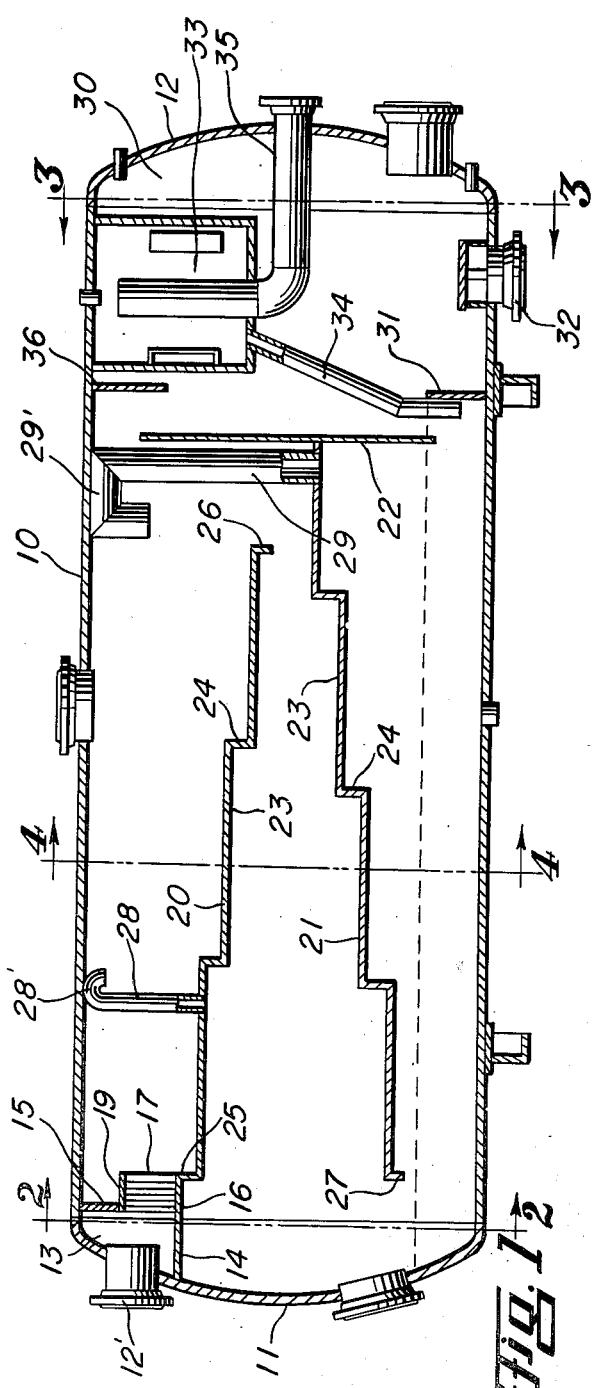
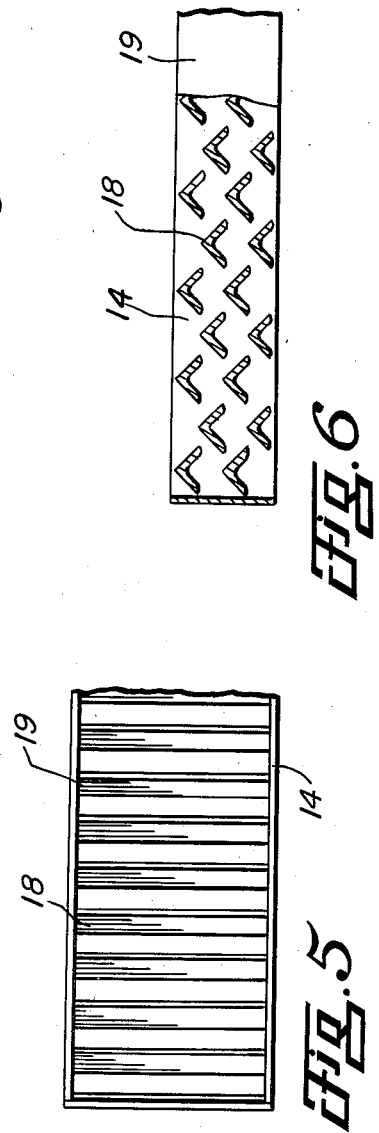
Clarence O. Glasgow
INVENTOR.
BY Ahley & Ahley
Attorneys Feb. 19, 1952     C. O. GLASGOW     2,586,221
HORIZONTAL SEPARATOR Filed Jan. 12, 1950     2 SHEETS—SHEET 2

Clarence O. Glasgow
INVENTOR.

BY Ahley & Ahley
Attorneys

Patented Feb. 19, 1952

2,586,221

UNITED STATES PATENT OFFICE 2,586,221

HORIZONTAL SEPARATOR

Clarence O. Glasgow, Tulsa, Okla., assignor to National Tank Company, Tulsa, Okla., a corporation of Nevada Application January 12, 1950, Serial No. 138,242

7 Claims. (Cl. 183—2.7)

This invention relates to new and useful improvements in horizontal separators.

One object of the invention is to provide an improved horizontal oil and gas separator especially adapted to heavy crude oil and crude oil containing a high percentage of paraffin wherein considerable gas in suspension is entrained in the flow stream.

Another object of the invention is to provide an improved horizontal separator of the character described wherein means is provided for spreading the oil in a ribbon-like flow or relatively broad, shallow or thin layers and cascading the flowing oil to give the suspended gas globules or bodies full opportunity to bubble up through the oil, whereby the gas is released at the surface of the oil stream; also whereby, the oil flow is agitated and the gas bodies are dissipated, agglomerated or displaced, as an aid in degassing the oil.

A further object of the invention is to provide a horizontal separator of the character described wherein a scrubber is provided adjacent the inlet to extract oil from the free gas flowing in the stream and a mist extractor is connected with the gas outlet to remove any entrained moisture or mist from the separated gas.

Still another object of the invention is to provide an improved horizontal separator having cascading trays, one above the other and stepped down in reverse directions, whereby an elongate cascading path is provided, sufficient to permit the gas to escape from the oil and the tank is fully utilized.

A construction designed to carry out the invention will be hereinafter described together with other features of the invention.

Figure 2:
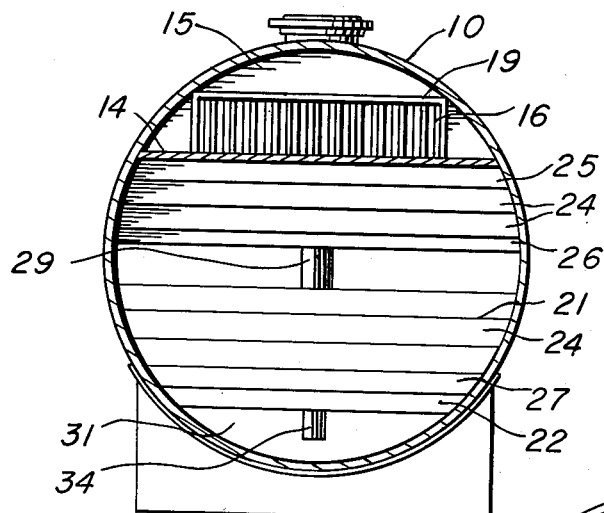
Figure 3:
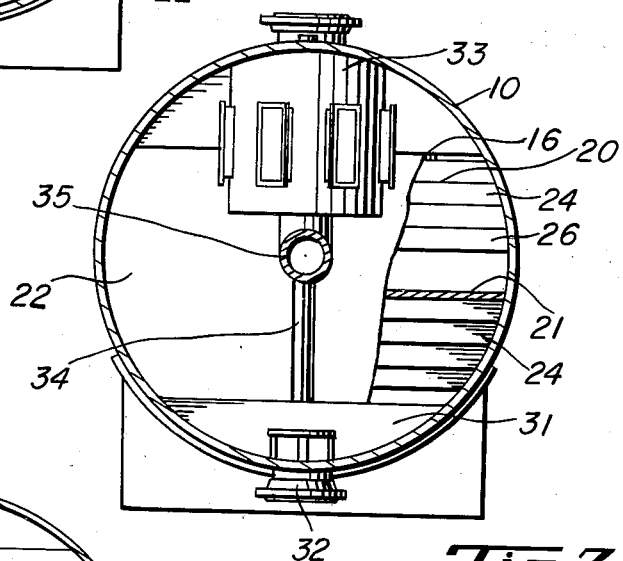
Figure 4:
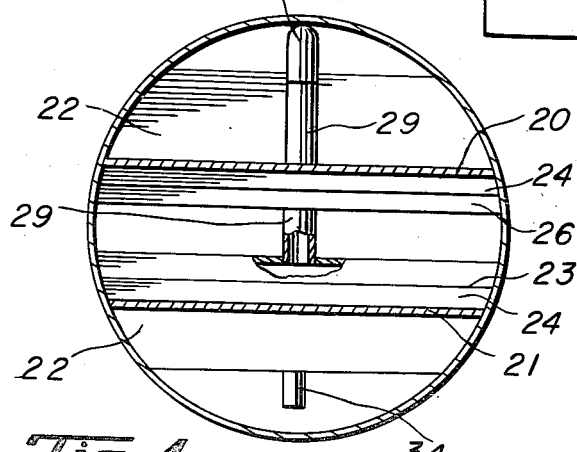

The invention will be more readily understood from a reading of the specification and by reference to the accompanying drawings, wherein an example of the invention is shown, and wherein:

Fig. 1 is a longitudinal, vertical sectional view of a horizontal separator constructed in accordance with the invention, Fig. 2 is a transverse, cross-sectional view taken on the line 2—2 of Fig. 1, Fig. 3 is a transverse cross-sectional view taken on the line 3—3 of Fig. 1, Fig. 4 is a transverse cross-sectional view taken on the line 4—4 of Fig. 1, Fig. 5 is a partial front elevation of the scrubber, and Fig. 6 is a partial plan view of the scrubber, the top plate being omitted.

In the drawings the numeral 10 designates an elongate, cylindrical, horizontal tank having a crowned head 11 welded to its front end and a similar head 12, welded to its rear end. Near the top central portion of the head 11, an inlet collar 12' extends therethrough and is welded thereto. A transverse inlet box 13 is formed across the head by a horizontal bottom plate 14 and an upright transverse wall 15 having an elongate rectangular opening 16. The collar projects into the box medially of the opening 16, which latter is of short height and extends substantially across the tank. The front end of a transverse scrubber 17 is mounted in the opening and the influent entering the box 13 from the collar flows into and through said scrubber.

The scrubber as is best shown in Figs. 5 and 6 comprises upright staggered vanes 18 which are V-shaped in cross-section with their open sides toward the opening 16. These vanes extend from the bottom plate 14 to a top plate 19. Some amount of mist or liquid bodies may be suspended in the gas and the purpose of the scrubber is to baffle out these liquids so that they flow down the vanes to the bottom plate 14. The oil, of course, flows over the plate through the bottom of the scrubber.

A transverse cascading tray 20 extends rearwardly in the tank from the bottom plate 14. A similar cascading tray 21 underlies the first tray and extends forwardly in the tank from an upright cross partition 22. The side edges of the trays are secured to the inner surface of the tank wall. Each tray includes broad, shallow steps or pans 23, each subsequent pan being at a slightly lower elevation than the preceding pan. The pans are connected by short transverse risers 24. The forward end of the first pan of the tray 20 is attached to the rear edge of the bottom plate 14 by a riser 25. The last or rear pan of the tray 21 is disposed a substantial distance from the partition 22 and has, along its rear edge, a depending apron or lip 26 which transversely overhangs the first or uppermost pan of the tray 21.

The tray 20 is disposed longitudinally in the upper half of the tank, while the tray 21 is disposed longitudinally in the lower half of said tank. The trays provide a continuous, reverse flow, cascading conductor having successive steps, each succeeding step being at a lower elevation. The principle involved is that of spreading the influent oil in a broad, shallow or ribbon-like stratum or stream and cascading this stream while flowing it, whereby gas globules or bubbles, which may be minute, are allowed to ascend and break through the surface of the stream because of such spreading, thus releasing the gas and the stream is also agitated to effect upward displacement and some agglomeration of said globules, thus aiding in releasing the gas suspended in the oil.

The travel path over the trays is of such elongation as to give the gas bodies full opportunity to escape. This separator is particularly adapted to handle heavy crude oils which may have high percentages of paraffin and the separation of entrained gas is difficult owing to the viscosity and density of such oil. The last or front pan 23 of the lower tray 21 has a depending, transverse apron or lip 27 along its forward edge and the degassed oil discharges at the front end of the tank into a body or stratum of oil maintained along the bottom of the tank.

Gas released under the tray 20 and tending to move to the highest portion of said tray will escape upwardly through a pipe 28 rising from the first pan 23 of said tray. The pipe 28 has a down-turned elbow 28' at the highest point in the tank, whereby gas is discharged downwardly into the gas flow path above the tray 20. Gas which flows into the tank and released gas flowing into the upper zone of the tank, passes rearwardly over the top of the partition 22. Gas trapped under the tray 21 escapes upwardly through a pipe 29, extending from the first pan 23 of said tray and is discharged at the top of the tank through a down-turned elbow 29'.

The lower edge of the partition 22 while immersed in the oil, terminates above the bottom of the tank and thus the oil may flow thereunder. The partition being oil-sealed at its bottom and having its upper edge adjacent the top of the tank, separates the rear portion of said tank into a gas chamber 30. A weir plate 31 extends across the bottom of the tank and is spaced a short distance in rear of the partition. The upper edge of this plate, which is above the lower edge of the partition, determines the oil level forwardly thereof. The tank has an oil outlet 32 between the plate 31 and the head 12 and a suitably controlled outlet valve (not shown) may be connected to this outlet to carry off the degassed oil and to maintain an oil level at the bottom of the chamber 30.

Since the gas which escapes over the partition 22 into the chamber 30, may entrain some mist, a cylindrical mist extractor 33 is suspended from the top of the tank. This extractor is of conventional construction having inlet louvers, whereby the gas is whirled circumferentially therein. A liquid drain pipe 34 leads from the bottom of the extractor down into the body of oil in front of the plate 31. An angular gas outlet pipe 35 extends down through the extractor and out through the head 12. A suitable gas valve (not shown) may be connected to the pipe 35, whereby pressure may be carried in the tank, if desired. A transverse baffle 36 suspended from the top of the tank between the partition and the extractor, extends below the top edge of said partition and deflects the gas flow downwardly into the chamber 30.

The influent stream entering the box 13 through the collar 12' is conducted through the scrubber 17, whereby free gas is separated and liquid bodies suspended in the gas are extracted by the vanes 18 and caused to flow down and mix with the oil flowing through the bottom of the scrubber. Since the box 13 and the scrubber are broad, the stream is induced to spread and when the oil flows off the rear edge of the bottom plate it readily spreads into a broad, shallow stratum or layer. The first pan 23 is of such area and the inlet rate and volume of flow of the influent, is such, as to produce the formation recited.

The oil stratum is quite shallow, usually a fraction of an inch in height or thickness. Because of this shallowness gas globules will readily ascend and break through the surface of the oil layer. As the oil is cascaded to the next pan 23 of the tray 20, the spread will be maintained but there will be an agitation and such an eruption or effervescence, as to cause the gas to bubble out and be released. The cascading is continued down the tray 20 and extended along the tray 21. The agitation occurs at each riser 24 and the oil then spreads over the pan until it cascades therefrom. By the time the oil reaches the lower end of the tray 21, it will be fully degassed or substantially so. The aprons 26 and 22 serve to trap gas under the trays 20 and 21.

What I claim and desire to secure by Letters Patent is:

1. A horizontal oil and gas separator including, an elongate horizontal tank, an upstanding transverse plate across the bottom of the tank in the rear portion thereof, an upright transverse partition across the rear portion of the tank having its lower edge below and forward of the upper edge of the plate, the plate acting to trap liquids in advance thereof and the lower portion of the partition acting to obstruct the flow of gas rearwardly above the trapped liquid, said tank having a forward end in advance of the partition and a rear end in rear of the partition, an inlet in the upper portion of the forward end of said tank, a downwardly stepped cascading tray extending longitudinally in the upper portion of the tank and having its front end below and communicating with the inlet and its rear end spaced from the partition and below the top of said partition, and a second downwardly stepped cascading tray extending forwardly longitudinally in the tank from said partition below the first tray and above and overlying the liquid area in front of said plate, a gas outlet from the rear end of the tank in rear of said partition, and a liquid outlet from the rear end of the tank in rear of said plate.

2. A horizontal oil and gas separator as set forth in claim 1, with a gas conductor leading upwardly from the rear end of the second cascading tray.

3. A horizontal oil and gas separator as set forth in claim 1, with a gas conductor leading upwardly from the front end of the first named cascading tray.

4. A horizontal oil and gas separator as set forth in claim 1, with a mist extractor mounted in the upper portion of the tank in rear of the plate and communicating with the tank above the plate and over the first named cascading tray and also connected with the gas outlet.

5. A horizontal oil and gas separator as set forth in claim 1, wherein the cascading trays include broad relatively shallow stepped pans.

6. A horizontal oil and gas separator including, an elongate horizontal tank having an influent inlet at its front end and oil and gas outlets at its rear end, a first cascading tray across the tank extending longitudinally downwardly therein in the upper portion thereof rearwardly from the inlet end of the tank and having a lower rear end with a transverse edge, a second cascading tray across the tank extending longitudinally downwardly towards the front end of the tank having its upper rear end rearward of the rear end of the first tray and underlying the first tray, the second tray being disposed to receive oil from the first tray and to discharge it at the front end of the tank, means at the bottom of the tank below the second tray for receiving oil from the second tray and maintaining an oil stratum below the second tray, and an upright transverse wall at the rear end of the second tray terminating below the top of the tank and above the rear end of the first tray whereby gas may pass to the rear of the tank and to the gas outlet and having its lower end below the top of the stratum maintaining means above the bottom of the tank and forwardly of said means, the oil outlet being below the overflow of the stratum maintaining means.

7. A horizontal oil and gas separator as set forth in claim 6, and a mist extractor mounted in the upper portion of the tank in rear of said partition and connected with the gas outlet of the tank.

CLARENCE O. GLASGOW.

REFERENCES CITED

The following references are of record in the file of this patent:

UNITED STATES PATENTS

| Number | Name | Date |
| --- | --- | --- |
| 1,499,710 | Weisgerber | July 1, 1924 |
| 1,552,071 | McDermet | Sept. 1, 1925 |
| 1,702,612 | Morse | Feb. 19, 1929 |
| 2,349,944 | Dixon | May 30, 1944 |